United States Patent [19]

Buschmann et al.

[11] Patent Number: 4,669,050
[45] Date of Patent: May 26, 1987

[54] TIME PULSE GENERATING CONTROL DEVICE FOR CYCLICALLY OPERATING PRINTING MACHINES

[75] Inventors: Falk Buschmann, Coswig; Karl-Heinz Foerster, Dresden; Volker Eichler, Weinboehla; Hartmut Heiber, Radebeul; Volkmar Dittrich, Coswig, all of German Democratic Rep.

[73] Assignee: VEB Kombinat Polygraph "Werner Lamberz", Leipzig, German Democratic Rep.

[21] Appl. No.: 623,914

[22] Filed: Jun. 25, 1984

[30] Foreign Application Priority Data

Jun. 23, 1983 [DD] German Democratic Rep. .................................... 2522741

[51] Int. Cl.⁴ ...................... G04G 3/00; G05B 11/26; B41F 5/00
[52] U.S. Cl. .................................... 364/569; 101/184; 364/523
[58] Field of Search ........... 364/523, 565, 569, 431.04; 101/183, 184; 250/231 SE

[56] References Cited

U.S. PATENT DOCUMENTS

| | | | |
|---|---|---|---|
| 4,036,190 | 7/1977 | Bigliani et al. | 364/431.04 X |
| 4,116,125 | 9/1978 | Förster et al. | 101/184 X |
| 4,181,962 | 1/1980 | West, Jr. et al. | 364/565 |
| 4,296,471 | 10/1981 | Goux | 364/565 X |
| 4,496,989 | 1/1985 | Hirosawa | 364/523 X |
| 4,511,797 | 4/1985 | Pohlig et al. | 250/231 SE |

FOREIGN PATENT DOCUMENTS 2220601 12/1972 Fed. Rep. of Germany ...... 264/523

Primary Examiner—Felix D. Gruber
Attorney, Agent, or Firm—Michael J. Striker

[57] ABSTRACT

In a control device for a cyclically operating printing machine, operative for generating time pulses or signals for activating functional units of the printing machine and comprising a pulse generating device, the pulse generating device is formed by an angular encoder connected to a cycle shaft of the machine, and the pulse processing circuit includes a circuit for generating binary addresses corresponding to a rotary speed of the cycle shaft storing predetermined time signals and having addressing inputs, and a PROM memory connected to the circuit for generating binary addresses.

3 Claims, 3 Drawing Figures

TIME PULSE GENERATING CONTROL DEVICE FOR CYCLICALLY OPERATING PRINTING MACHINES

CROSS-REFERENCE TO RELATED APPLICATIONS

Reference is made to the related copending patent applications Ser. No. 623,911, filed June 25, 1984; Ser. No. 623,912, filed June 25, 1984; and Ser. No. 623,913, filed June 25, 1984, all assigned to the same assignee.

BACKGROUND OF THE INVENTION

The present invention relates to a control device utilized in a cyclically operating printing machine for generating a sequence of pulses occurring at predetermined time instants during a working cycle. A plurality of decentral time pulse generating control devices have been known in printing machines, which have been used, for example for a cycle printed sheet control, sequential switching the printing machine on and off or a cyclic sheet separation.

In German patent publication DE 2,220,601 a control system has been disclosed for a multiple ink rotary printing machine, operated for the activation of the printing mechanism or individual functional groups of the printing mechanism, at sequential time points during the running of a sheet in the printing machine. This known system includes pulsing stages for generating clock signals corresponding to the angular positions of the rotated single revolution shaft. This impulse control includes a signal transmitter, an interrogator responser, a signal generator, and a shift register train connected to each other.

The disadvantage of this known control device is that the pulsing stages of the control of the printing machine utilized for generation of time pulses can be used for one purpose only and therefore a number of time pulse generating control devices are required in the printing machine.

A further disadvantage of the known control system resides in that the control pulsing stages can prepare only unmodified time signals and can not be used for signal modifying, for example for producing time signals which are required for controlling dead time periods of the positioning units of the printing machine.

Furthermore, with the known devices it is necessary to use pulse forming stages which are constructed only for a non-changeable pulse width for generating pulses of various widths.

The entire disclosure of the above mentioned patent publication is incorporated herein by reference.

SUMMARY OF THE INVENTION

It is an object of the present invention to provide a central control system for generating various timing signals which is inexpensive and provides for a highly reproducible angular positioning of the units of the printing machine and also for a possibility to easily change individual cycles or time shifts.

It is a further object of the present invention to provide a control device for producing time pulses for a central generation and modification of timing signals.

These and other objects of the invention are attained by a control device for generating time signals for activating functional units of a cyclically operating printing machine, comprising pulse generating means connected to a rotary part of the printing machine; and pulse processing means connected to said pulse generating means, said pulse generating means including an angular encoder for generating first binary addresses of angular increments of said rotary part, and said pulse processing means including means connected to said angular encoder for generating second binary addresses of a number of revolutions per a time unit of said rotary part, and at least one memory circuit having addressing inputs connected to said means for generating said second binary addresses and to said angular encoder, said memory circuit being formed by PROM storing predetermined timing signals addressable by said first and second binary addresses.

The device for generating said second binary addresses may include an AND gate having one input connected to said angular encoder, another input, and an output, a monostable multivibrator controlled by a triggering input and being connected to said another input of the AND gate, and a counter having a counting input connected to said output of the AND gate, said counter having a plurality of parallel outputs connected to a second binary address-data bus.

The pulse processing means may further comprise at least one address converting circuit means interconnected between said means for generating the second binary addresses and additional memory circuit means, each of said additional memory circuit means being formed by a PROM for storing predetermined modified addresses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
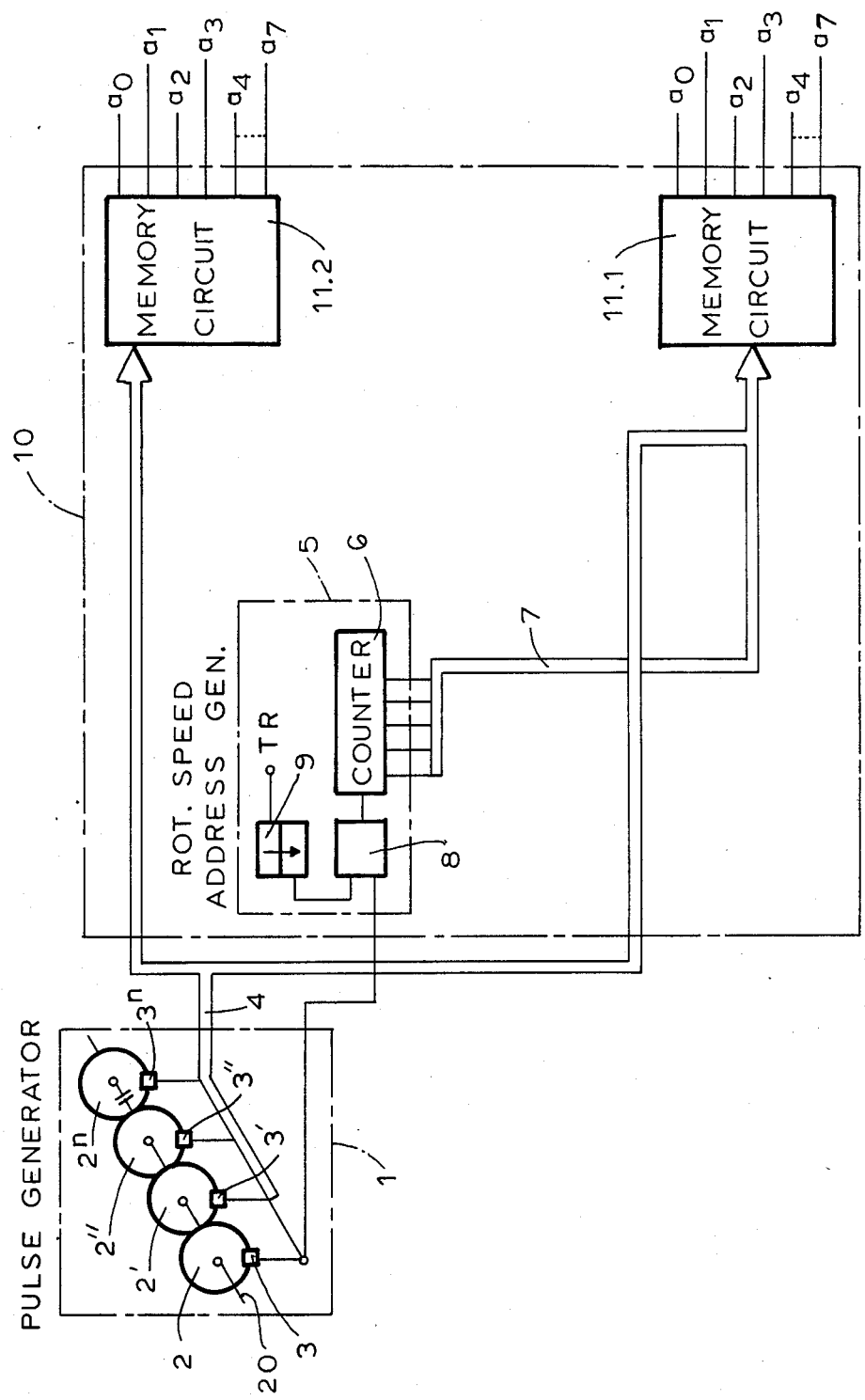
FIG. 1 is a schematic block diagram illustrating a time pulse generating device according to the invention.

Referring now to the drawings in detail and firstly to FIG. 1 thereof it will be seen that the time pulse generating device for a printing machine comprises a pulse generator 1 formed as an angular encoder. The angular encoder 1 includes a number of encoder discs $2''$ mounted on the same cycle shaft and each being formed of a plurality of illuminated, or light and dark encoded portions, which pass by rigidly arranged signal receivers 3, $3'$, $3''$ to $3^n$. Encoder discs which are used to convert shaft positions to corresponding binary values representing angles of rotation $\phi$ in degrees are known from prior art. Scanning of the encoder discs 2, $2'$ $2^n$ by receivers 3 to $3^n$ can be carried out, for example according to a slot initiation principle. Encoder discs 2, to $2^n$ are all arranged on a cycle shaft 20 coupled to the main shaft of the printing machine.

By the cycle shaft is meant a shaft, which makes one rotation per a working cycle of the printing machine. It is also possible to use a single encoder disc with a plurality of encoding tracks or so called multi revolution angular encoder instead of the number of encoder discs $2' \ldots 2''$.

All parallel outputs of receivers 3 are connected to an angle of rotation address data bus 4.

The time pulse generating device of this invention further comprises a pulse processing device 10 which includes a device for generating rotary speed addresses 5.

The rotary speed address generating device 5 comprises a counter 6 for counting angular position pulses from receiver 3. The parallel outputs of the counter 6 are connected to an angle of rotation address data bus 7, these parallel outputs forming the output of the rotary speed address generating device 5. Device 5 further comprises an AND gate 8 and a monostable multivibrator 9 triggered by a triggering input signal TR. One input of AND gate 8 is connected to the output of receiver 3 of angular encoder 1 while another input of AND gate 8 is connected to the output of monostable multivibrator 9. The output of AND gate 8 is connected to the input of counter 6 for counting the number of angular increments $\phi$ of the shaft.

The time pulse generating device according to this invention, and more specifically its pulse processing device 10, includes a memory circuit 11.1 formed as a conventional programmable read-only memory PROM. The memory circuit 11.1 is connected at its address input side, via the address data buses 4 and 7, to the device 5 for generating rotary speed addresses and to the angular encoder 1 for generating angle of rotation address. Memory circuit 11.1 has outputs for reading out impulse sequences corresponding to timing signals stored at the addressed memory locations.

The time pulse generating device further includes another memory circuit 11.2 which is also formed as a generally known PROM. Memory circuit 11.2 is connected at the address input side thereof, via the angle of rotation address data bus 4 with the angular encoder 1.

Each programmable read only memory circuit PROM is comprised in the known manner from the following functional blocks:

a storage matrix wherein in each intersection point one bit of the predetermined timing signals is stored;

decoder circuit which is comprised of column matrix decoders and row matrix decoders; a row of the matrix is called up by the row matrix decoders and via the column matrix decoders are called up so many columns simultaneously as allowed by the range of data of PROM; the bits stored at the intersection points are supplied to an output buffer;

the output buffer includes output buffer amplifying stages which amplify the read-out content of the memory circuit and apply it to the outputs; and a Y connection which actuates the columns of the matrix called by the column matrix decoder and transmit their content to the output buffer.

Figure 2:
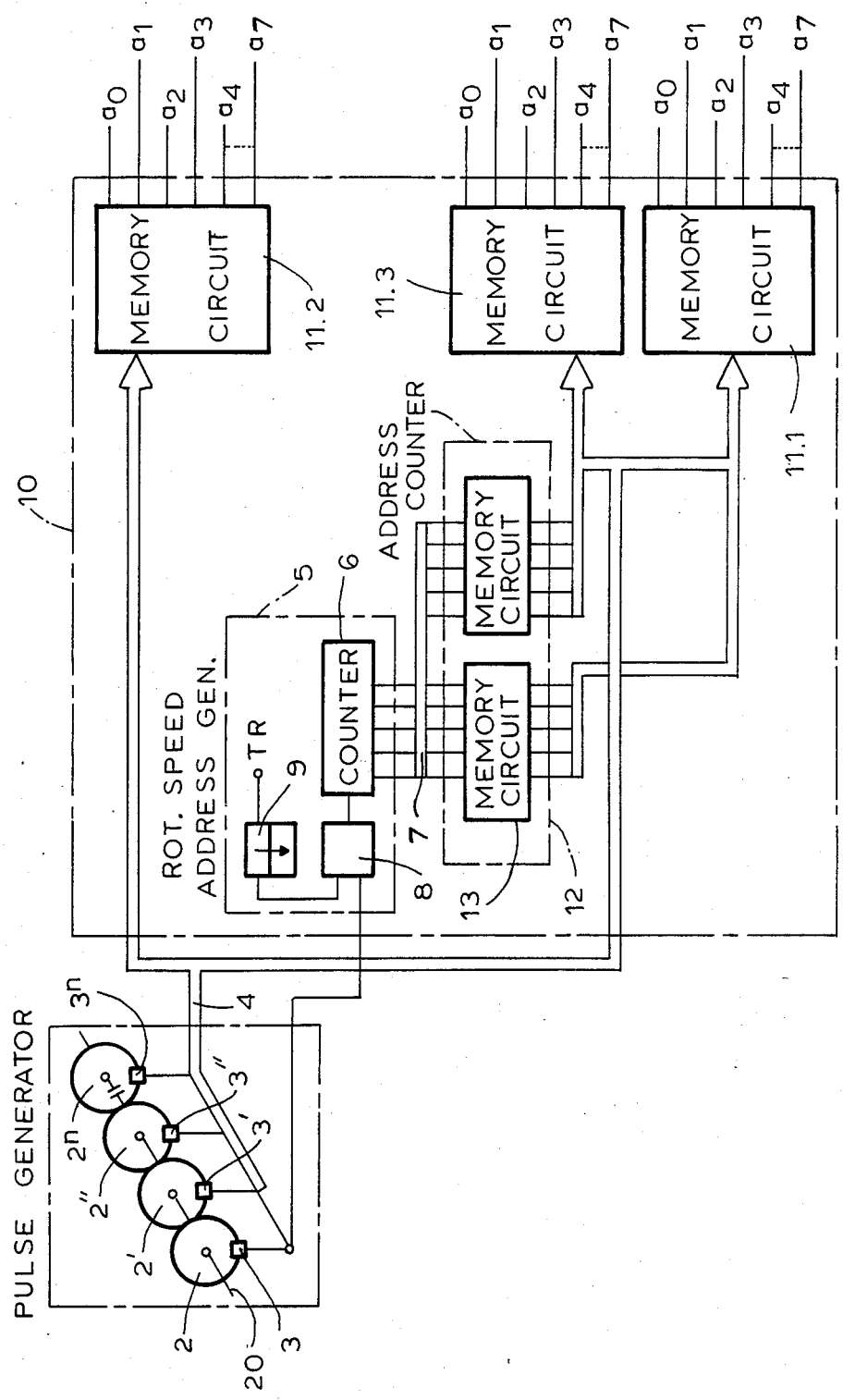
FIG. 2 is a schematic block diagram showing a time signal generating device of FIG. 1 provided with an address converting device.

With reference to FIG. 2 it will be seen that this figure illustrates a modified embodiment of the pulse processing device 10 of the time pulse generating device of FIG. 1. It comprises a device 5 for generating rotary speed addresses similar to that described in connection with FIG. 1 but connected to an address converting device 12. The latter includes at least one address converting memory circuit 13 also formed by programmable read-only memory PROM. The PROM is formed analogously to the above described memory circuit 11. Two memory circuits 13 of the address converting device 12 are shown in FIG. 2. Each memory circuit 13 is connected to an assigned additional memory circuit 11.1 or 11.3 also formed by PROM.

The mode of operation of the time pulse generating device of the present invention is as follows:

After the switching on an operating voltage, the respective receivers 3, 3', 3'' $\ldots$ 3$^n$ are consecutively activated and inactivated in accordance with the angular positions of the rotating cycle shaft 20 of the angular encoder 1 of the impulse generating device 1 indicate a momentary angle by means of bit patterns formed in the respective encoder discs 2, 2', 2'' $\ldots$ 2$^n$ by the beforementioned light and dark encoded portions. These bit patterns are transmitted in parallel from the receivers 3 to 3'' into the angle of rotation address data bus 4 and directly control the address inputs of the memory circuit 11.2. This condition of the address bus 4 is thus identical to the actual angular position of the cycle shaft 20, which is referred to a predetermined reference value F.

When cycle shaft 20 is rotated then the respective receivers 3, 3' $\ldots$ 3'' of the angular encoder 1 will be differently activated in accordance with the codes of the encoded portions which are fixedly arranged on the encoder discs 2, 2' $\ldots$ 2$^n$. This different activation makes available a new address for the memory circuit 11.2 for each angular increment of the cycle shaft. The number of different addresses generated per one revolution of the cycle shaft 20 is dependent upon the number of receivers 3 or encoder discs 2 provided in the angular encoder 1 (for example 8 encoder discs issue, respectively $2^8 = 256$ various combinations of addresses). These 256 addresses are supplied one after another to the addressing inputs of the memory circuit 11.2.

As a result, the programmable read-only memory 11.2 will issue at its outputs $a_o$ through $a_7$ sequences of addressed timing pulses which are independent from each other. The start the end as well as the width of the timing pulses are relatively easy variable by a suitable program for the PROM.

Example:

| Address (decimal) | Stored Content | | | | | | | |
|---|---|---|---|---|---|---|---|---|
| 0 | 0 | 0 | L | 0 | 0 | 0 | 0 | 0 |
| 1 | 0 | L | L | 0 | | | | |
| 2 | L | L | 0 | 0 | | | | |
| 3 | L | 0 | 0 | 0 | | | | Impulse |
| 4 | L | 0 | 0 | 0 | | | | |
| 5 | 0 | 0 | 0 | 0 | | | | |
| 256 | 0 | 0 | 0 | 0 | | | | |
| Outputs | $a_0$ | $a_1$ | $a_2$ | $a_3$ | $a_4$ | $a_5$ | $a_6$ | $a_7$ |

The outputs $a_o$ to $a_7$ are connected respectively, to a single timing data bus. The storage locations shown in the above table store one bit each.

The data for the rotary speed address data bus 7 are produced by the device 5 in the following fashion.

Impulses issued by receiver 3 which supplies a large number of impulses per one revolution of the cycle shaft) are fed into an input of AND gate 8. Upon triggering, the monostable multivibrator 9 opens AND gate 8 in accordance with its adjusted holding time interval and the AND gate supplies the pulses issued by receiver 3 to a counting input of counter 6 in which these pulses are counted. The resulting binary coded count at the parallel outputs of the counter 7 is supplied to the rotary speed address bus 7 which together with the angle of rotation address bus 4 delivers corresponding addresses to address inputs for controlling memory circuits 11.1; 11.3 and 11.2.

The condition of the address data bus 7 corresponds to the respective angular or rotary speed. Wat, with which the cycle shaft 20 of the angular encoder rotates.

In the exemplified case the rotary speed address bus 7 has a word length of 4 bits which can denote 16 various ranges n of rotary speed, (n=16).

In order to store bit patterns which produce at the outputs ao to a7 of the memory circuit PROM timing signals indicative of rotary speed a memory circuit PROM must be used which has at least $n \times 250$ addresses, whereby n is the number of various ranges of rotary speed.

The address of PROM is now made into the binary code as follows:

| $2^{11}$ $2^{10}$ $2^9$ $2^8$ | $2^7$ $2^6$ $2^5$ $2^4$ $2^3$ $2^1$ $2^0$ |
|---|---|
| Rotary speed | Angle of rotation |

The following structure is obtained in PROM:

| Rotary Speed range | Address | Stored Content |
|---|---|---|
| 1 | 0 | 0 |
|   | 1 | L |
|   | . | ↓ Information Shift |
|   | . |   |
|   | 255 | 0 |
| 2 | 256 | L |
|   | 257 | 0 |
|   | . | . |
|   | . | . |
|   | 512 | 0 |
| 3 | 513 | 0 |
|   | 514 | 0 |
|   | . | . |
|   | . | . |
|   | 769 | 0 |
|   | . |   |
|   | . |   |
| 16 | 3840 | 0 |
|   | . | . |
|   | . | . |
|   | 4096 | 0 |
|   | a0 a1 a2 a3 a4 a5 a6 a7 |   |

Each rotary speed range respectively embodies one revolution at one predetermined speed of the cycle shaft. By means of a corresponding programming of the PROM as stored timing signal issued at output ao for example, can be assigned to different angles of rotation when another rotary speed is measured and thereby another rotary speed range is taken into consideration.

In the embodiment of FIG. 2 the result of counting of impulses is not fed directly from the counter 6 to the memory circuit 11.1 or 11.3 but this result is first subjected to an address conversion in one or a number of address converters 12. The address conversion is performed in order to obtain from a linear dependence (slope m=1/1) a modified dependence of the cycles according to the angular speed of the shaft.

The modified dependence can be understood as follows:

linear dependence with the slope m≠1
linear dependence with the slope m=1/1 or m≠1
with a partial suppression of the angular speed components—for example, in the range of speeds from 0–1000 no information is issued (suppression); only with the speed over 1000 the information of speed components will be issued
non-linear dependence.

The address converting devices 12 is formed by PROMs which are programmed analogously to the memory circuits 11. Thus the programmable read-only memory circuits 13 of the address converting device 12 will issue, as a response to a bit combination applied to their inputs via the rotary speed address data bus 7 and in accordance with the respective internal programming, a predetermined bit combination at their outputs. Therefore, an address modified in dependence on the angle of rotation and rotary speed of the shaft will be read out at the output of address converting device 12.

Figure 3:
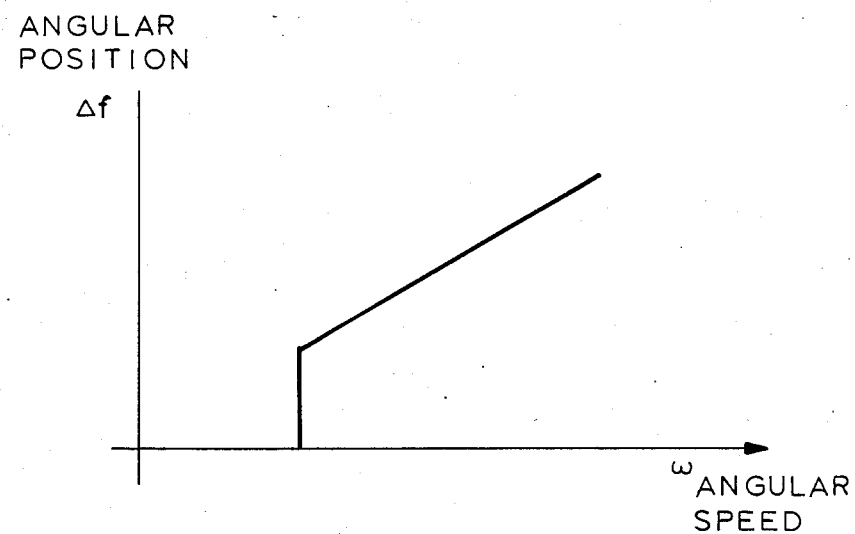
FIG. 3 is a graph showing the relationship between the angular position of a cycle shaft coupled to the main shaft of the printing machine and the angular velocity of the cycle shaft.

For example, with the following internal programming and with the partial suppression of the angular speed count, the performance can be seen from the graph of FIG. 3:

| Input Address (decimal) | | | | | | | | |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | L | 0 | 0 |
| 6 | 0 | 0 | 0 | 0 | 0 | L | 0 | L |
| 7 | 0 | 0 | 0 | 0 | 0 | L | L | 0 |
| 8 | 0 | 0 | 0 | 0 | 0 | L | L | L |
| 9 | 0 | 0 | 0 | 0 | L | 0 | 0 | 0 |
| 10 | | | | | | | | |
| | a7 | a6 | a5 | a4 | a3 | a2 | a1 | a0 |
| | | | | | | | | Outputs |

Due to the provision of two address converting memory circuits 13 a modification of the above discussed dependence is possible according to two independent principles.

It will be understood that each of the elements described above, or two or more together, may also find a useful application in other types of time pulse generating system for cyclically operating printing machines differing from the types described above.

While the invention has been illustrated and described as embodied in a time pulse generating device for a variable speed cyclically operating printing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A control device for generating time signals for activating functional units of a printing machine having cyclically operating part, comprising pulse generating means connected to the cyclically operating part; and pulse processing means connected to said pulse generating means, said pulse generating means including an angular encoder for generating first binary addresses of angular increments of said cyclically operating part, and said pulse processing means including means for generating second binary addresses corresponding to a number of revolutions per a time unit of said cyclically operating part, and at least one memory circuit having addressing inputs connected to said means for generating said second binary addresses and to said angular encoder, said memory circuit being formed by PROM storing predetermined timing signals addressable by said first and second binary addresses.

2. The control device as defined in claim 1, wherein said device for generating the second binary addresses includes an AND gate having one input connected to said angular encoder, another input, and an output, a monostable multivibrator controlled by a triggering input and being connected to said another input of the AND gate and a counter having a counting input connected to said output of the AND gate, said counter having a plurality of parallel outputs connected to a second binary address-data bus.

3. The control device as defined in claim 1, wherein said pulse processing means further comprise at least one address converting circuit means interconnected between said means for generating the second binary addresses and additional memory circuit means, said address converting circuit means being formed by PROM for storing predetermined modified address data.

* * * * *